(12) United States Patent
Painter et al.

(10) Patent No.: US 6,460,266 B1
(45) Date of Patent: Oct. 8, 2002

(54) GRAPHICAL DESIGN AID AND METHOD OF PROVIDING VISUAL GUIDES ON KEYLINE DESIGN DRAWINGS

(75) Inventors: Lorie Painter, Rockford, IL (US); Owen Johnson, Rockford, IL (US)

(73) Assignee: J. L. Clark, Inc., Rockford, IL (US)

( * ) Notice: Subject to any disclaimer, the term of this patent is extended or adjusted under 35 U.S.C. 154(b) by 0 days.

(21) Appl. No.: 09/428,610

(22) Filed: Oct. 27, 1999

(51) Int. Cl.$^7$ .......................... G01B 3/14; B43L 13/00
(52) U.S. Cl. ................... 33/562; 33/566; 33/18
(58) Field of Search ........................... 33/1 B, 1 BB, 33/1 K, 562, 563, 565, 566; 434/72, 75, 80, 81, 89, 90, 91, 92, 98; 40/768

(56) References Cited

U.S. PATENT DOCUMENTS

| | | | | |
|---|---|---|---|---|
| 4,149,320 A | * | 4/1979 | Troyer et al. | 33/758 |
| 4,692,810 A | | 9/1987 | Machii et al. | 358/256 |
| 4,779,346 A | * | 10/1988 | Schafer | 33/1 B |
| 4,956,906 A | | 9/1990 | Masse et al. | 413/8 |
| 4,998,882 A | * | 3/1991 | Glover | 434/98 |
| 5,011,411 A | * | 4/1991 | Loewy | 434/72 |
| 5,012,590 A | * | 5/1991 | Wagner et al. | 33/494 |
| 5,215,396 A | * | 6/1993 | Rogers | 33/1 B |
| 5,255,352 A | * | 10/1993 | Falk | 395/125 |
| 5,282,306 A | | 2/1994 | Katsuhiro et al. | 29/469.5 |
| 5,292,255 A | * | 3/1994 | Goldwasser | 434/81 |
| 5,335,421 A | * | 8/1994 | Jones, Jr. | 33/494 |
| 5,368,485 A | * | 11/1994 | Phillips | 434/75 |
| 5,490,080 A | | 2/1996 | Jarrige et al. | 364/468 |
| 5,673,489 A | * | 10/1997 | Robell | 33/1 B |
| 6,094,965 A | * | 8/2000 | Hubbard et al. | 33/562 |

FOREIGN PATENT DOCUMENTS

EP    0 418 053 A1    3/1991

* cited by examiner

Primary Examiner—Diego Gutierrez
Assistant Examiner—Madeline Gonzalez
(74) Attorney, Agent, or Firm—Leydig, Voit & Mayer, Ltd.

(57) ABSTRACT

Presented is a design aid and method for use in designing a two dimensional graphical illustration for a two dimensional sheet to be formed into a three dimensional item such as a decorative tin or metallic container. The graphical design aid comprises a two dimensional graphical surface which defines various regions of relative distortion resulting from the manufacturing process whereby the three dimensional item is formed from the two dimensional sheet. Once the various regions of relative distortion have been mapped, they are preferably filled with a graphical distortion designator such as a fill color and/or pattern. The various regions may conform to or depart from design lines based upon the distortion or function of the resulting region of the formed three dimensional item. The method of aiding the design of the two dimensional graphical illustration for a two dimensional sheet to be formed into a three dimensional item may begin by stripping selected information from an engineering blank layout, identifying regions of relative distortion, designating a graphical distortion designator to the various regions, and then filling these regions with the appropriate designator. The graphical designer observes the resulting colored overlay and conforms the graphical layout design to this surface. This surface may be a separate layer in a computerized graphics program.

21 Claims, 6 Drawing Sheets

(5 of 6 Drawing Sheet(s) Filed in Color)

GRAPHICAL DESIGN AID AND METHOD OF PROVIDING VISUAL GUIDES ON KEYLINE DESIGN DRAWINGS

FIELD OF THE INVENTION

The instant invention relates to engineering blank layout drawings, and more particularly to keyline drawings for decorative tins and metal enclosures.

BACKGROUND OF THE INVENTION

Since the earliest days of consumer packaging, metal containers and decorative tins have proven to be as fashionable as they are durable. While originally used to provide product protection from the elements as well as from breakage for many dry goods, teas, spices, lozengers, saltine crackers, etc., and while these metallic containers are still used in this fashion for these very purposes, the style, design, and collectability of these metallic containers and decorative tins have driven the demand for these products to an unprecedented level.

The desire for functional, yet collectable, metallic containers and decorative tins has provided great opportunity for the artistic talent of the designers of these products. In addition to the traditional round and square tins with removable lids, and smaller rectangular containers with hinged lids, many decorative tins are now being produced in a wide variety of shapes, including houses, animals, and recently NASCAR racing cars. Typically, included on all of these various types of metallic containers and decorative tins are the graphic images and colors, product identification information and corporate and product logos, as well as other graphics which distinguish these containers and the products provided therein. Further, modern packaging laws and regulations also require that a significant amount of actual text be included on these containers as well. While many manufacturers choose to include this required textural material on separate stickers or labels which are affixed to the metallic containers and decorative tins, such increases the overall cost of the packaging, and is therefore undesirable for some product manufacturers.

A continuing challenge in the actual manufacture of these decorative tins and metallic containers lies with the proper placement and design of the artwork included thereon. The design process for these decorative tins begins with the project engineers who must develop engineering drawings which illustrate how the sheet metal material used to manufacture these articles will be cut, bent, rolled, stretched, embossed, etc. to form the actual shape of the enclosure. Once this product formation design process is complete, these engineering design drawings become the basis for the ultimate digital file used by the graphic artists who must come up with the artwork design layout to be placed on the product. For ease of printing, the artwork is applied to the article prior to its actual manufacture while it is still in two dimensional flat sheet form. While this greatly decreases the cost of printing by allowing the use of two dimensional printing processes, it presents a significant problem for the graphic artist who must actually design a layout which will appear properly once the various bending, stretching, rolling, etc. processes are completed on the flat sheet metal to form the actual three dimensional product.

Conventionally, the external graphic artist was provided a two dimensional film based keyline for the article from which she was required to design a graphical layout for implementation thereon. These keylines were initially generated from the engineering blank layouts by removing certain information not germane to the graphical design. However, the keylines generated in this fashion provided only limited information which was particularly relevant to the graphic artist to aid her in the design of the appropriate images to be printed thereon. Recognizing this, the keylines were modified to provide additional information significant to the graphic artists to aid them in their artwork design. These keyline drawings included additional lines designating certain areas appropriate for different types of graphics on the finished decorative tin or metal enclosure. These additional lines were typically supplemented with textural information to identify the type of line or the meaning thereof. As an example of such a keyline drawing, reference is made to FIG. 1b.

As may be seen from this FIG. 1b, the keyline drawing 10 includes graphic design limit lines 12 which enclose regions of relatively undistorted surface area into which graphical elements which should not be distorted on the finished product should be placed. However, since these graphic design limit lines 12 are often hard to distinguish from the manufacturing lines 14 generated on the original engineering drawing, additional textural material 16 is required to be added to help the graphic designer clarify the appropriate regions for different types of textural material. However, typically these written cues do not suffice without additional design notes 18 provided on the drawing to further clarify regions which do not lend themselves to separate marking by design limit lines 12. Even with these additional notes 18, however, a majority of the regions on the keyline drawing are left without any designator as to what type of graphics or colors may be placed therein. Further, many of the regions on the keyline drawing contain no indication as to whether or not they will remain visible once the particular part has been assembled.

As a result of these limitations with the information which may be conveyed on the keyline drawing, the graphical design is typically required to be done, and modified, several times before it is finalized. The necessity for these multiple edits to finalize a graphical design on the three dimensional metallic container or decorative tin significantly increases the cost associated with the design process. Often, undesirable distortions of the graphical design are not discovered until prototype items have been produced in readiance for final manufacture. Graphical redesign at this stage of the production process becomes quite significant since machinery often needs to be changed to accommodate the modified design. This problem is further exacerbated by the fact that many keyline drawings include regions whose distortion during the manufacturing process varies, but which is typically not separately marked on a conventional keyline drawing. These regions, while not defining a design limit, nonetheless need to be accounted for during the graphic design process. Unfortunately, these non-defined areas of varying distortion are typically only accounted for once a prototype has been manufactured and the first round of graphic design modifications made. As will be recognized by one skilled in the art, this increases the design cycle, increases the time to market of the product, and increases the overall cost of the packaging design.

SUMMARY OF THE INVENTION

In view of the above, it is an object of the instant invention to provide a new and improved method of generating keyline drawings for decorative tins and metal containers which overcomes the above and other problems existing in the art. More particularly, it is an object of the instant invention to provide a new and improved design aid and method of designating various regions of acceptable graphics design, copy, and distortion in a keyline drawing for decorative tins and metallic containers. Additionally, it is an object of the instant invention to provide such a method that results in a colored keyline diagram which may be used by graphic designers visually during their design layout. It is a further object of the instant invention to simplify these keyline drawings by eliminating the need for the provision of additional graphic design limit lines and textural material. It is a further object of the instant invention to reduce the design cycle time of a graphic design for a decorative tin or metallic container, thereby decreasing the time to market and overall design costs of the product. It is a further object of the instant invention to identify varying regions of distortion on a keyline drawing for a decorative tin or metallic container to allow for single design cycle graphic layout.

In view of these objects it is a feature of the instant invention to provide a visual guide to be used in conjunction with conventional keyline drawings to aid the graphic designer in the graphic design layout for decorative tins and metallic containers. It is a further feature of the instant invention to provide a color overlay for conventional keyline drawings identifying various regions of differing distortion and functionality of the resulting manufactured part identified by the conventional keyline drawing. It is a further object of the instant invention to provide this visual color overlay as a removable surface in a graphics design program. It is an additional feature of the instant invention to identify by color overlay a design limit indicating the maximum allowed area for design image to be viewed on fabricated container parts, e.g., body, cover, bottom, including debossed bead. Additionally, it is a feature of the instant invention to provide indication of visible non-essential design areas, tab, lock, and bleed areas wherein the color, design, and copy can bleed through, but which are not essential except where the lock match occurs. It is an additional feature of the instant invention to identify the curl, hem, seam, and hinge area wherein bleed color may be applied, although no copy or design is appropriate. Additionally, it is a feature of the instant invention to identify by color overlay the bead and inverted bead area through which color should bleed, and in which it is okay to run copy and design since this will be viewed on the formed part. It is an additional feature of the instant invention to identify severe distortion areas in which bleed solid colors and/or forgiving designs may be utilized and in which copy or critical design elements may not be placed. It is a further feature of the instant invention to identify an embossing limit that designates the maximum allowed region for an image that will be embossed. Further, it is a feature of the instant invention to identify a no print area in which varnish or lacquer only may be placed since dark coatings or ink will typically scratch off during usage.

In view of these objects and features, a preferred embodiment of the instant invention provides a graphical design aid for use in designing a two dimensional graphical illustration for a two dimensional sheet to be formed into a three dimensional item, e.g. a decorative tin or metallic container. The graphical design aid comprises a two dimensional graphical surface defining a plurality of regions, each of which corresponding to areas of relative distortion of the two dimensional sheet when formed into the three dimensional item. At least one of these regions is substantially filled with a distortion designator. Preferably, a plurality of the regions is filled with a distortion designator. The distortion designators include fill colors, and each different fill color represents a different relative distortion of the two dimensional sheet when formed into the three dimensional item.

The regions defined preferably include a design limit region which designates a maximum allowed area for design images to be viewed on the three dimensional item, including a debossed bead. Additionally, the regions preferably include a visible non-essential design area. Further, the regions include a tab, lock, and bleed area through which color, design, and copy may bleed. The regions also preferably include a curl, hem, seam, and hinge area in which bleed color only may be placed. A bead and inverted bead area through which color should bleed and copy and design may run since the bead and inverted bead area is visible on the formed three dimensional item is also preferably included. Severe distortion areas into which bleed solid colors and forgiving designs may be placed are also preferably provided, as is an embossing limit area indicating a maximum allowed area for placement of images that will be embossed in the forming of the three dimensional item. Finally, the regions also preferably include a no print area from which dark coatings and ink are likely to scratch off.

In a preferred embodiment of the instant invention, a different distortion designator is utilized to fill regions of different relative distortion of the two dimensional sheet when formed into the three dimensional item. These distortion designators include fill colors and fill patterns. Preferably, at least one region includes both a fill color and a fill pattern. In a highly preferred embodiment of the instant invention, the two dimensional graphical surface is a computer generated layer suitable for use with a computer graphics design program.

Also provided by the teachings of the instant invention is a method of aiding the design of a two dimensional graphical illustration for a two dimensional sheet to be formed into a three dimensional item. This method comprises the steps of identifying a plurality of regions of relative distortion of the two dimensional sheet when formed into the three dimensional item, assigning a graphical designator to each different region of relative distortion, and filling each of the regions with its assigned graphical designator. Preferably, the step of assigning a graphical designator includes the steps of assigning a fill color and assigning a fill pattern.

In a preferred embodiment, the step of identifying a plurality of regions includes the steps of identifying at least one of a design limit area which designates a maximum allowed area for design images to be viewed on the three dimensional item, including a debossed bead; a visible non-essential design area; a tab, lock, and bleed area through which color, design, and copy may bleed; a curl, hem, seam, and hinge area in which bleed color only may be placed; a bead and inverted bead area through which color should bleed and copy and design may run since the bead and inverted bead area is visible on the formed three dimensional item; severe distortion areas into which bleed solid colors and forgiving designs may be placed; an embossing limit area indicating a maximum allowed area for placement of images that will be embossed in the forming of the three dimensional item; and a no print area from which dark coatings and ink are likely to scratch off.

In a preferred embodiment, the method further comprises the steps of removing selected information from an engineering blank layout of the two dimensional sheet, and adding the filled regions of relative distortion to form the keyline. The preferred method further comprises the step of constraining a graphical design to the keyline with the added filled regions of relative distortion. Preferably, the step of adding the filled regions of relative distortion includes the steps of providing a two dimensional layer containing the filled regions of relative distortion, and overlaying the two dimensional layer on the keyline. Additionally, the step of assigning a graphical designator to each different region of relative distortion includes the step of assigning a graphical designator in accordance with a standard guide.

A preferred method of the instant invention of designing a graphical layout for a three dimensional item formed from a two dimensional sheet comprises the steps of: observing a keyline drawing of the two dimensional sheet, observing a color overlay for the keyline drawing indicating a plurality of regions of relative distortion resulting from forming the three dimensional item from the two dimensional sheet, and conforming the graphical layout design to the keyline drawing and the color overlay.

Other object and advantages of the invention will become more apparent from the following detailed description when taken in conjunction with the accompanying drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1A:
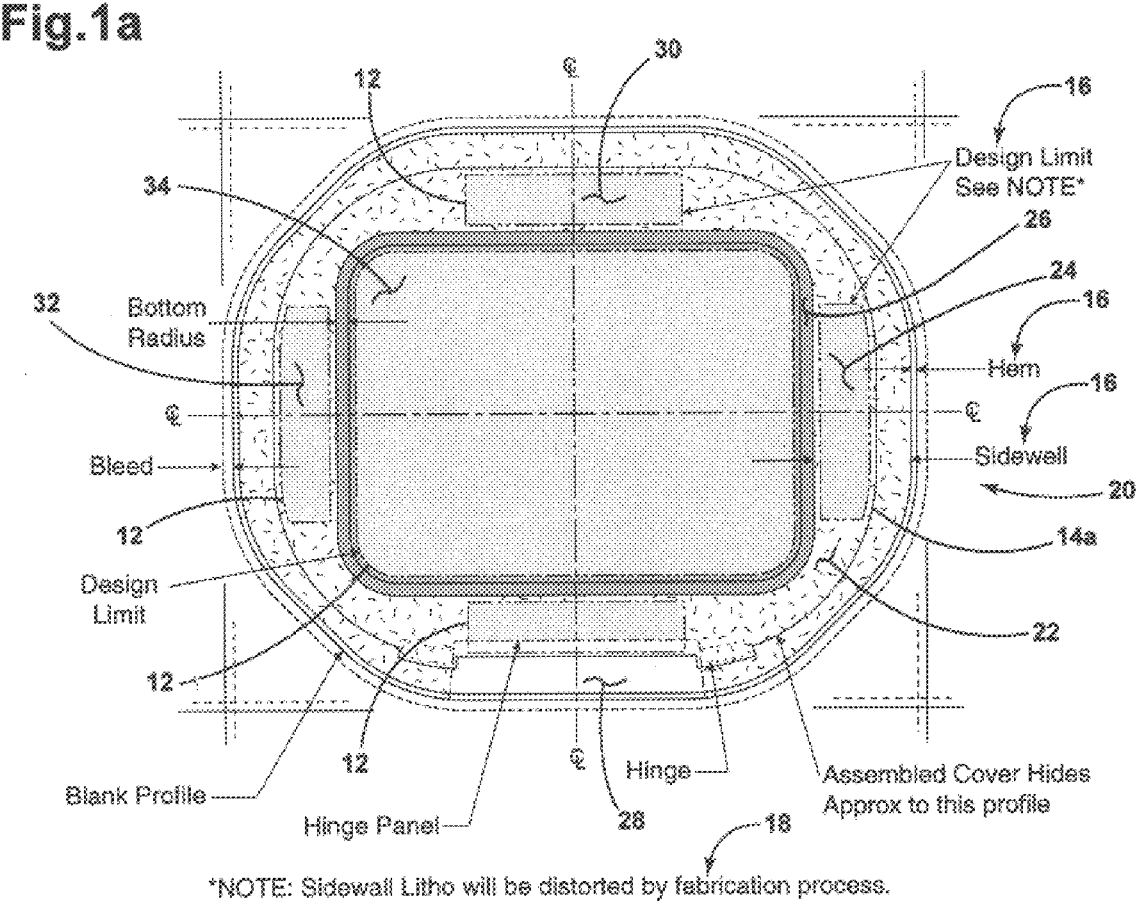
FIG. 1a illustrates a color keyline drawing made in accordance with the method of the instant invention.
Figure 1B:
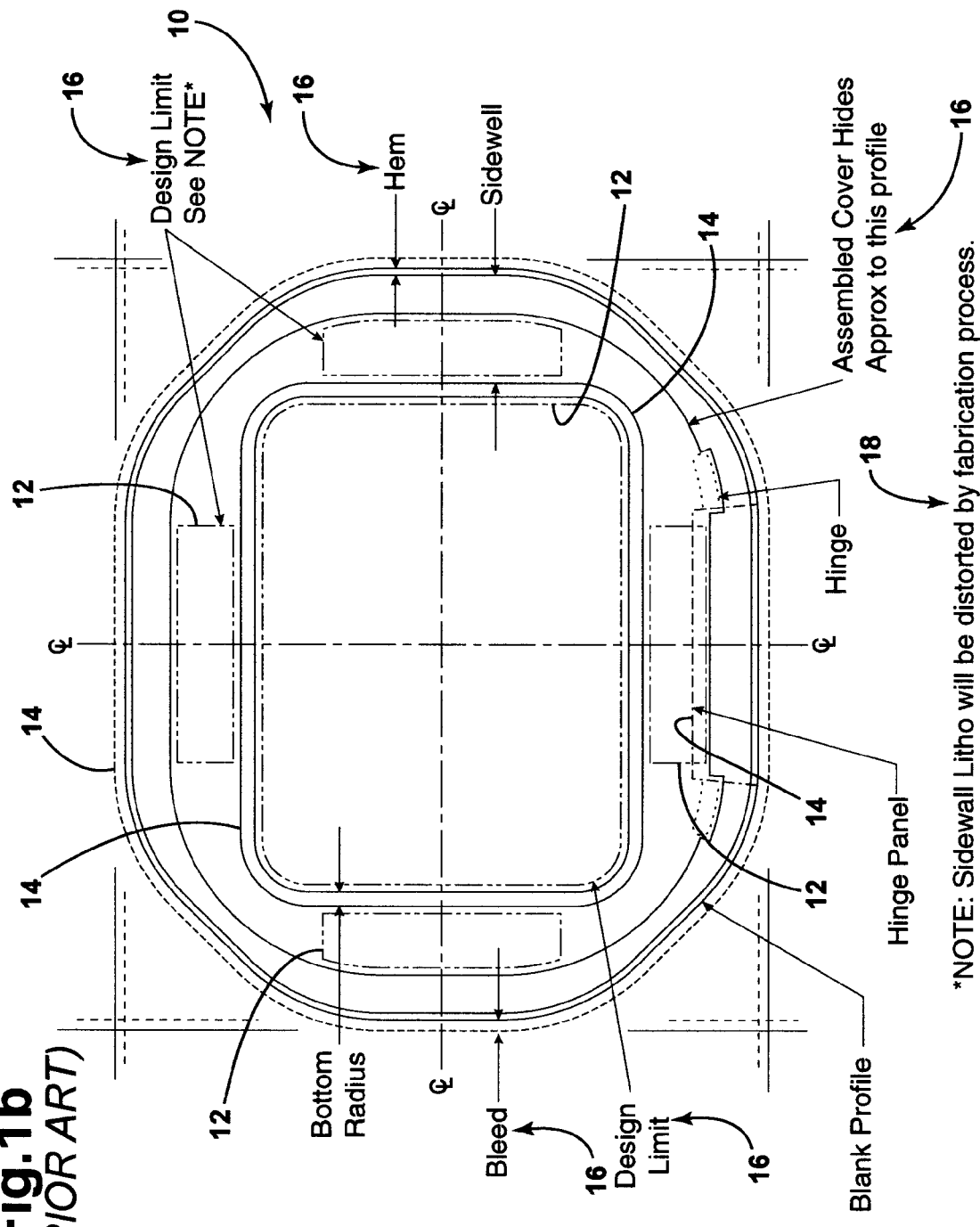
FIG. 1b illustrates a conventional keyline drawing.

A preferred embodiment of a graphical design aid in accordance with the instant invention is illustrated in FIG. 1a. Certain features and aspects of this preferred embodiment may best be appreciated through an examination of FIG. 1a in comparison to a conventional keyline drawing as illustrated in FIG. 1b and discussed above. As may be seen from this FIG. 1a, a graphical design aid constructed in accordance with the teachings of the instant invention provides a two dimensional graphical surface 20 defining a plurality of separate regions, for example, regions 22, 24, 26, 28, 30, 32, and 34. Unlike the conventional keyline drawing illustrated in FIG. 1b, the various regions 22–34 of the instant invention are defined by relative distortion as opposed to by the various bend section lines 14 of FIG. 1b. As an example, region 22 of FIG. 1a encompasses a majority of what would appear to be at least two separate regions separated by design line 14a in FIG. 1a. However, since the manufacturing process utilized to form a three dimensional item from the two dimensional sheet of metallic material results in severe distortion throughout region 22, the provision of only design line 14a may lead a graphic designer to believe that the two regions separated thereby may have differing distortion characteristics. As a result, the graphic designer may mistakenly place copy or other critical design elements within one of the regions separated by design line 14a not realizing that all of region 22 experiences severe distortion during the manufacturing process. The conventional keyline drawing as illustrated in FIG. 1b does not differentiate nor provide any indication of the severe distortion existing within this region 22 identified in FIG. 1a.

By designating regions on the two dimensional sheet based upon the relative distortion of these regions resulting from the manufacturing process of the three dimensional item, the instant invention provides the graphic designer with a map by which they may properly design a graphic illustration which will not require the multiple modifications typically necessitated through prototype fabrication before arriving at a final design. To further aid the graphical designer, the graphical design aid of the instant invention fills each of the various regions corresponding to areas of relative distortion with a series of distortion designators. As may be seen from FIG. 1a, these distortion designators may comprise fill colors such as are included in regions 24, 26, 28, 30, 32, and 34. Additionally, the regions of relative distortion may be filled with a distortion designator comprising a fill pattern without color such as is utilized to fill region 22. Of course, one skilled in the art will understand that it may be said that the regions containing only a fill color also include a fill pattern of solid, and likewise region 22 may be said to contain a fill color of clear and a fill pattern of scattered dashes. Regardless of the interpretation, the design aid of the instant invention provides a visual mapping which may be utilized by the graphic designer to properly place the graphics, copy, and colors to be utilized on the final three dimensional item by visually indicating the various regions of relative distortion which constrain the graphical design, or to which the graphical design must conform. Additionally, while FIG. 1a illustrates an exemplary embodiment of the instant invention, it will be recognized by one skilled in the art that the additional material such as the textural notes 16 and 18, as well as the design limit lines 12 are not necessarily required, although they may be provided if the graphical designer so desires. However, as may be apparent to one skilled in the art, such information becomes superfluous when the two dimensional graphical surface 20 defining the plurality of regions of relative distortion are properly filled with a distortion designator based upon an accepted key or guide.

Figure 2:
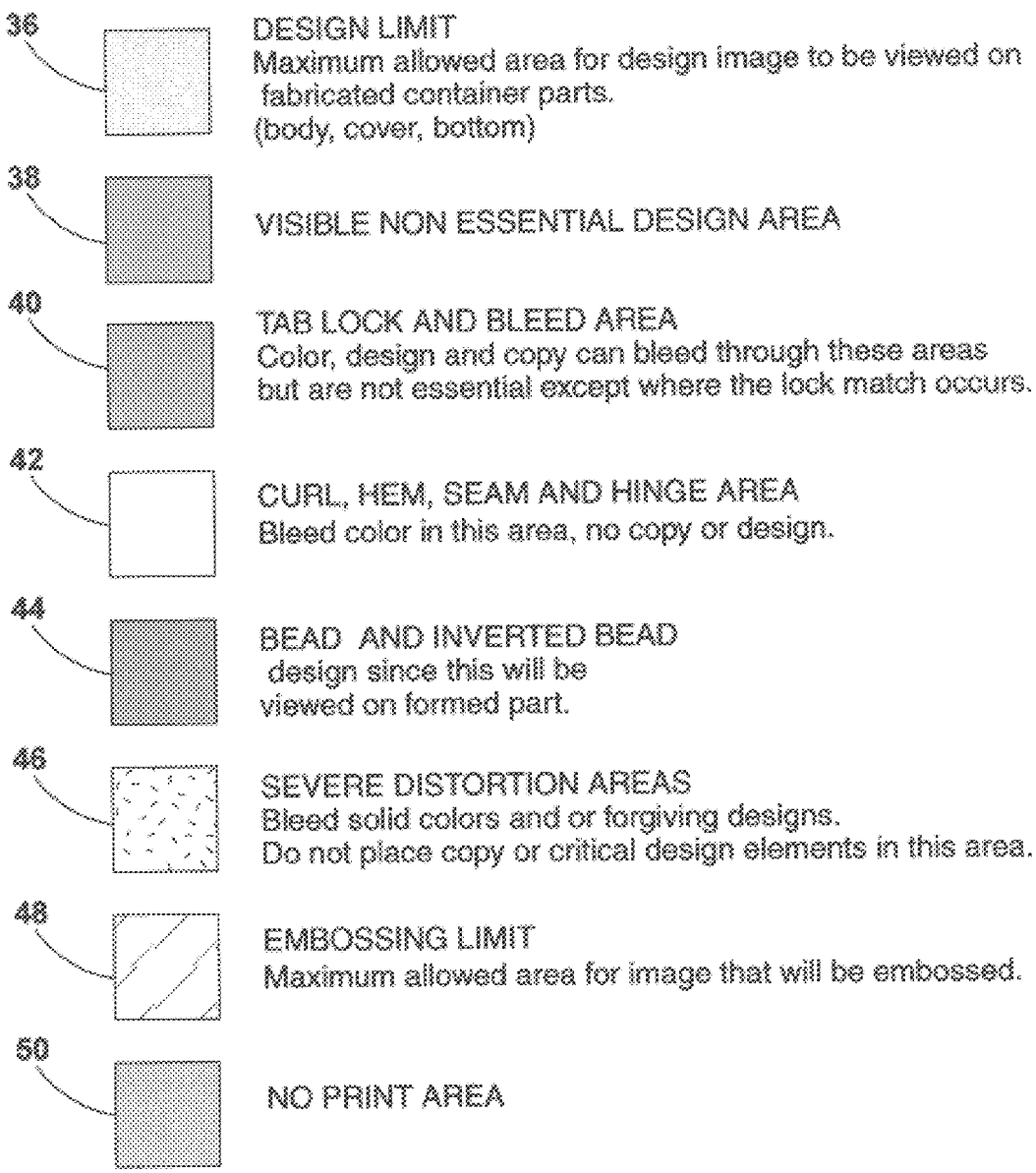
FIG. 2 illustrates a keyline overlay color guide constructed in accordance with the teachings of the instant invention.

While various implementations of distortion designator keys may be derived, and while the scope and spirit of the invention encompasses any and all such choices of colors and/or patterns, an exemplary embodiment of a key or guide to the distortion designators is illustrated in FIG. 2. This exemplary embodiment is provided by way of example and not by way of limitation. It is also recognized that the particular designation and categorization of regions of relative distortion may also vary from the specific examples provided in FIG. 2 depending on the particular design of the three dimensional item, and on varying levels of sophistication and detail necessitated by the final three dimensional item. These varying categories of regional designations are also considered to be within the scope and spirit of the instant invention.

In view of the above, and with specific attention now drawn to a preferred embodiment of a guide or key in accordance with the instant invention as illustrated in FIG. 2, it may be observed that eight separate categories of relative distortion are identified. The first of these identifiable categories is the design limit area of region 36 which, in this exemplary embodiment, is designated by a fill color of blue. This design limit region category 36 indicates to the graphical designer the maximum allowed area for a design image to be viewed on the fabricated three dimensional item without distortion. This includes regions on the body, cover, bottom, etc., of the finished three dimensional part. The design limit region category 36 may also include a debossed bead. A visible non-essential design area category 38 is also identified on the graphical design aid guide, and is designated by a fill color of green in this exemplary embodiment. The tab, lock, and bleed area category 40 is preferably designated by a fill color of pink, although other color or pattern schemes may also be chosen. This category 40 identifies where color, design, and copy can bleed through, but is not typically considered to be essential except where the lock match occurs on the finished three dimensional item.

The curl, hem, seam, and hinge area category 42 is identified in this exemplary embodiment by the color yellow. This category 42 indicates to the graphical designer where bleed color may be placed, but where no copy or design should be implemented. The bead and inverted bead on the finished three dimensional item are identified by category 44, which may preferably be designated by a fill color of orange. This category 44 indicates where color should bleed through, and where it is acceptable to run copy and design since this region will be viewed on the formed three dimensional item. Regions of severe distortion are also identified by category 46, preferably by a fill pattern of random scattered dashes. This category 46 indicates to a graphical designer areas for bleed solid colors and/or for very forgiving designs. This region also identifies to the graphical designer where no copy or critical design elements may be placed. Preferably, an embossing limit region category 48 is also identified for the graphical designer. This category 48 identifies the maximum allowed area for an image to be placed that will be embossed on the final three dimensional item. This embossing limit region often will occur as a subset of the design limit region as will be discussed with reference to FIG. 4 below. Finally, a preferred embodiment of the instant invention also identifies a no print region category 50 where only varnish or lacquer should be utilized. This category 50 indicates where dark coatings or ink will scratch off once the three dimensional item is formed and acquired by a consumer. Preferably, special approval should be required prior to allowing the placement of any graphical elements in this region.

Figure 3:
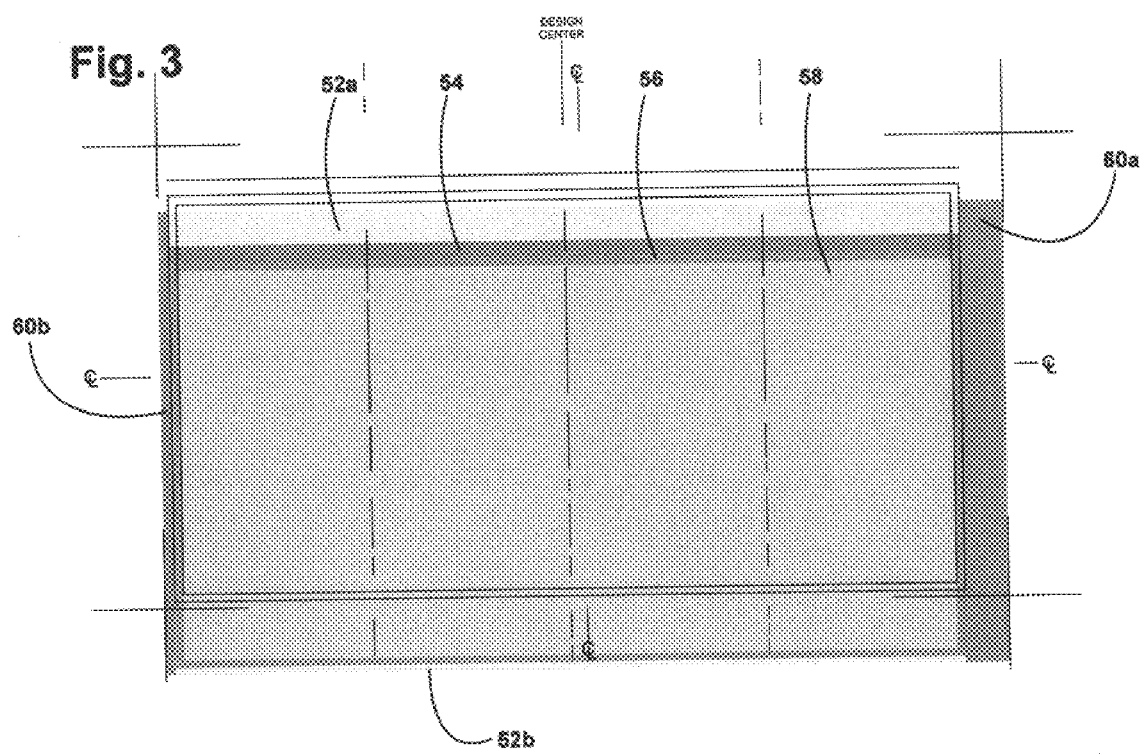
FIG. 3 is a color keyline drawing illustrating aspects of the instant invention.

An alternate embodiment of a design aid constructed in accordance with the teachings of the instant invention is illustrated in FIG. 3. As may be seen from this FIG. 3, and with reference to the design guide or key of FIG. 2, the graphical design for this particular part includes five separate regions of relative distortion to be considered in the development of the graphical design for the three dimensional item to be formed. Particularly, this two dimensional sheet includes a curl, hem, seam, and hinge area 52a and 52b on the top and bottom of the sheet respectively. Additionally, the three dimensional item will also include a bead or inverted bead as is designated by region 54. A region of visible non-essential design 56 is also included, and in this particular design frames design limit region 58. Once formed, the three dimensional item will also include a tab, lock, and bleed region 60a and 60b which will form a large lock and small lock respectively. By utilizing the teachings of the instant invention, additional added lines separating the various regions of relative distortion are not required due to the different colored regions which are visible to the graphic designer. Such visible transitions are apparent, for example, between the curl, hem, seam, and hinge area 52a and the large and small lock regions 60a and 60b. The choice of appropriate fill colors and/or patterns as the distortion designators between regions of relative distortion allow for a simplified graphical design aid which does not require the addition of multiple graphical limit lines and notes in addition to the engineering design lines typically included for the graphical designer.

Figure 4:
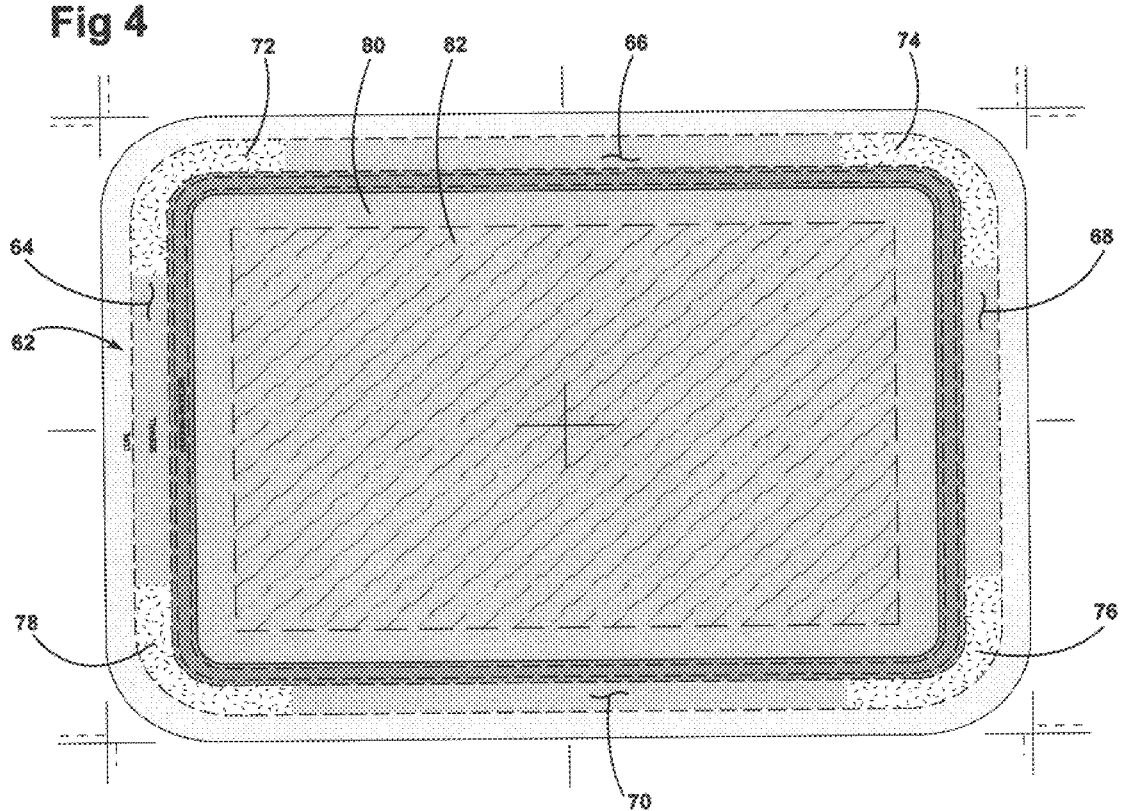
FIG. 4 is a color keyline drawing illustrating other aspects of the instant invention.
Figure 5:
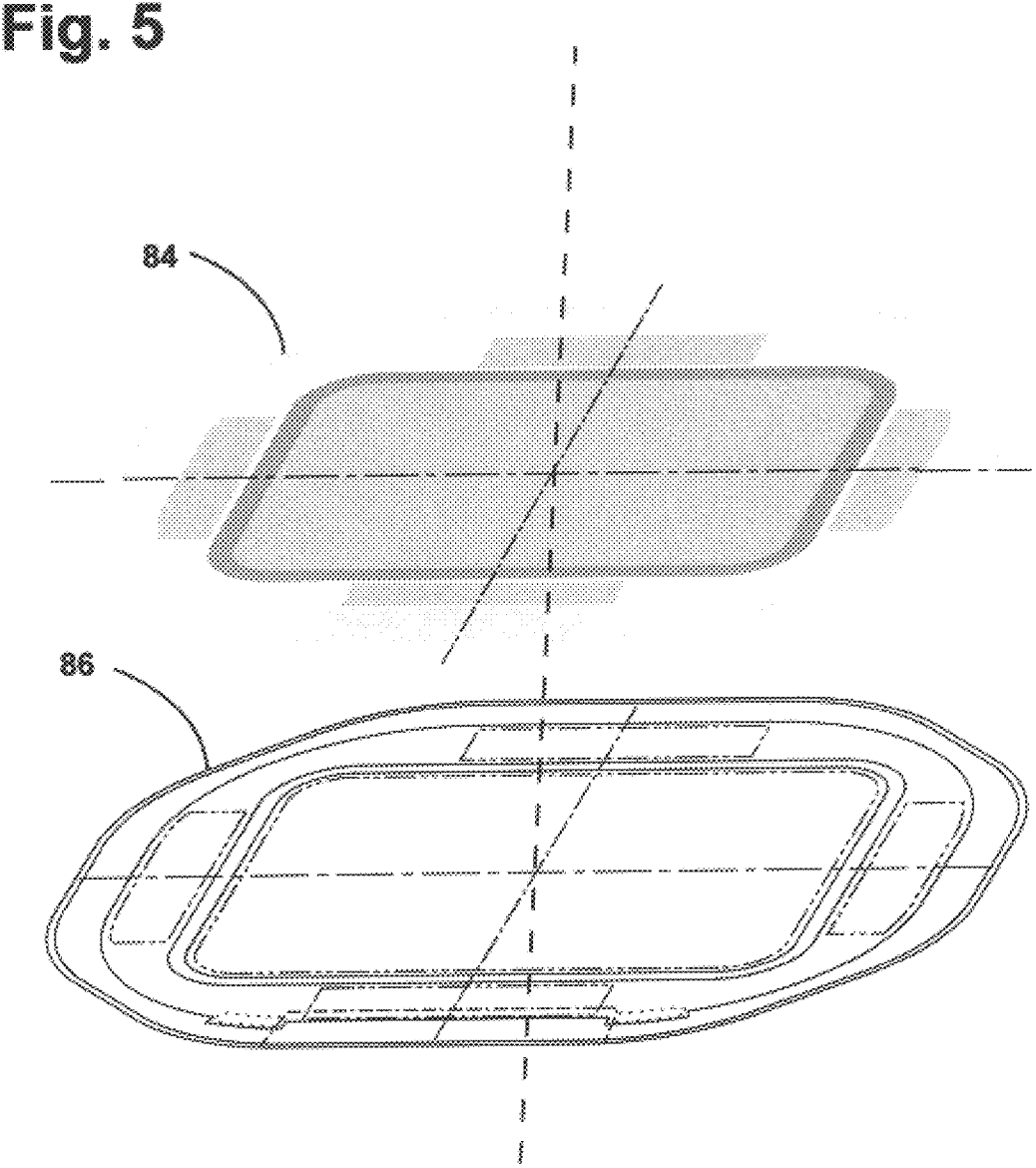
FIG. 5 is an exploded isometric view of drawing surfaces utilized in a typical graphics program including a color keyline overlay surface constructed in accordance with the teachings of the instant invention.

An additional embodiment of the instant invention illustrating further aspects of the invention is provided in FIG. 4. As may be seen from this FIG. 4, the sidewall 62 of the three dimensional item to be formed actually includes four design limit regions 64, 66, 68, and 70, as well as four regions of severe distortion 72, 74, 76, and 78. As may be seen from this FIG. 4, no additional lines are required to be added to the keyline drawing to separate these regions of different relative distortion because the visual difference provided by the different distortion designators selected adequately distinguish these regions. Specifically, the design limit regions 64–70 utilize a solid blue fill color while the regions of severe distortion 72–78 utilize a fill pattern of random scattered dashes. As also may be seen from this FIG. 4, the main design limit region 80 also includes an embossing region 82 as a subset thereof. This embossing region utilizes a fill pattern as its distortion designator. As such, it may be placed in the same region that is already filled with the light blue color designating the design limit region 80 without color mixing or other undesirable visual effects.

While the graphical design aid of the instant invention may be provided in many forms to aid the graphical designer in the design of the graphical layout in any form, including a printed sheet, transparency overlay, etc., most graphical designers utilize a computerized graphic design program to create their designs. Many programs are available on the market for such graphical design, including Adobe's Illustrator™ graphical design program. As with many computerized graphic design programs, Adobe's Illustrator™ program utilizes multiple layers that may be viewed or hidden by the designer. Therefore, a preferred embodiment of the instant invention provides the graphical design aid as a two dimensional graphical surface that is a computer generated layer 84 suitable for use in a graphics design program. The surface 84 would include all of the regional mappings with their associated distortion designator as a layer, which may be viewed or hidden by the graphical designer as she proceeds with her graphical design. This surface 84 would be overlaid on the keyline surface 86 which provides the basic outline of the two dimensional surface which will be formed into the three dimensional item in the manufacturing process. If desired, this regional mapping of the instant invention may be provided on a single surface combined on the same layer with the keyline drawing, if so desired, or if a non-layering graphic design program is utilized. However, a preferred embodiment of the instant invention provides a separate surface 84 for the regional mapping of the instant invention.

While the above discussion has focused on a pseudo-physical manifestation of the graphical design aid of the instant invention, one skilled in the art will recognize that the scope of the instant invention includes a method of aiding the design of a two dimensional graphical illustration for a two dimensional sheet to be formed into a three dimensional item by a manufacturing process. In its simplest form, this method includes identifying the plurality of regions of relative distortion of the two dimensional sheet when it is formed into the three dimensional item during manufacture. While various levels of distinction and categorization may be drawn between the various levels and severity of the distortion resulting from the manufacturing process, an exemplary embodiment of the method of the instant invention identifies at least one of the following relative distortion regions: a design limit region which designates a maximum allowed area for design images to be viewed on the three dimensional item, preferably including a debossed bead; a visible non-essential design region; a tab, lock, and bleed region through which color, design, and copy may bleed; a curl, hem, seam, and hinge area in which bleed color only may be placed; a bead and inverted bead area through which color should bleed and copy and design my run since this bead and inverted bead area are visible on the formed three dimensional item; a severe distortion region into which bleed solid colors and forgiving designs may be placed; an embossing limit region indicating a maximum allowed area for placement of images that will be embossed in the forming of the three dimensional item; and a no print area from which dark images and ink are likely to scratch off.

Once the various regions of relative distortion have been selected, a graphical distortion designator should be assigned to each different region of relative distortion. Preferably, the assignment is made based upon a common specified guide or key so that consistency between designs is maintained and the likelihood of confusion which may result from utilizing a non-consistent assignment of graphical designators is reduced. Once the designators have been assigned, each separate region of relative distortion should be filled with the assigned designator so that a complete graphical map is developed visually indicating the various regions of relative distortion. As discussed above, both fill colors and patterns may be utilized for the various regions, including, in appropriate circumstances, utilization of both a fill pattern and a fill color in the same region. One such example is illustrated in FIG. 4 as discussed above for three dimensional parts that include embossing within a main design limit region.

As discussed briefly above, the generation of such a graphical design aid may begin from an engineering blank layout which includes much information which is of no or only limited value to a graphical designer. This information may clutter or confuse the graphical designer when proceeding with the graphical design. Therefore, a preferred method of the instant invention includes the step of removing selected information from an engineering blank layout of the two dimensional sheet prior to adding the filled regions of relative distortion. If a layering type graphical computer program is utilized, this step may be implemented by simply hiding a design detail layer. However, based upon the type of engineering blank layout that is generated from the main engineering of the part itself, a separate keyline type drawing may be required to be generated. Once the regional mapping is complete, the graphical designer would then utilize this to constrain the graphical design.

From the graphical designer's standpoint, the method of designing a graphical layout for a three dimensional item formed from a two dimensional sheet in accordance with the teachings of the instant invention includes the steps of observing a keyline drawing of the two dimensional sheet, observing a color overlay for the keyline drawing indicating a plurality of regions of relative distortion resulting from forming the three dimensional item from the two dimensional sheet, and then conforming the graphical layout design to the keyline drawing and the color overlay. As discussed above, observing the color overlay may be an iterative process whereby the color overlay layer may be repeatedly turned on and off in a layering type graphical illustration and design program as desired by the particular designer. In fact, the layer representing the keyline drawing and the color overlay may be incorporated into a single layer as appropriate or desired.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A graphical design aid for use in designing a two dimensional graphical illustration for a two dimensional sheet to be formed into a three dimensional item, comprising a two dimensional graphical surface defining a plurality of regions, each of said regions corresponding to areas of relative distortion of the two dimensional sheet when formed into the three dimensional item, each of said regions being defined by a distortion designator.

2. The design aid of claim 1, wherein a plurality of said regions are filled with a distortion designator, wherein said distortion designators include fill colors, and wherein each different fill color represents a different relative distortion of the two dimensional sheet when formed into the three dimensional item.

3. The design aid of claim 1, wherein said regions include a design limit region which designates a maximum allowed area for design images to be viewed on the three dimensional item, including a debossed bead.

4. The design aid of claim 1, wherein said regions include a visible non-essential design area.

5. The design aid of claim 1, wherein said regions include a tab, lock, and bleed area through which color, design, and copy may bleed.

6. The design aid of claim 1, wherein said regions include a curl, hem, seam, and hinge area in which bleed color only may be placed.

7. The design aid of claim 1, wherein said regions include a bead and inverted bead area through which color should bleed and copy and design may run since said bead and inverted bead area is visible on the formed three dimensional item.

8. The design aid of claim 1, wherein said regions include severe distortion areas into which bleed solid colors and forgiving designs may be placed.

9. The design aid of claim 1, wherein said regions include an embossing limit area indicating a maximum allowed area for placement of images that will be embossed in the forming of the three dimensional item.

10. The design aid of claim 1, wherein said regions include a no print area from which dark coatings and ink are likely to scratch off.

11. The design aid of claim 1, wherein a different distortion designator is utilized to fill regions of different relative distortion of the two dimensional sheet when formed into the three dimensional item, said distortion designators including fill colors and fill patterns.

12. The design aid of claim 11, wherein at least one region includes both a fill color and a fill pattern.

13. The design aid of claim 1, wherein said two dimensional graphical surface is a computer generated layer suitable for use with a computer graphics design program.

14. A method of aiding the design of a two dimensional graphical illustration for a two dimensional sheet to be formed into a three dimensional item, comprising the steps of:

identifying a plurality of regions of relative distortion of the two dimensional sheet when formed into the three dimensional item;

assigning a graphical designator to each different region of relative distortion; and filling each of the regions with its assigned graphical designator.

15. The method of claim 14, wherein said step of assigning a graphical designator includes the steps of assigning a fill color and assigning a fill pattern.

16. The method of claim 14, wherein said step of identifying a plurality of regions includes the steps of identifying at least one of a design limit area which designates a maximum allowed area for design images to be viewed on the three dimensional item, including a debossed bead, a visible non-essential design area, a tab, lock, and bleed area through which color, design, and copy may bleed, a curl, hem, seam, and hinge area in which bleed color only may be placed, a bead and inverted bead area through which color should bleed and copy and design may run since said bead and inverted bead area is visible on the formed three dimensional item, severe distortion areas into which bleed solid colors and forgiving designs may be placed, an embossing limit area indicating a maximum allowed area for placement of images that will be embossed in the forming of the three dimensional item, and a no print area from which dark coatings and ink are likely to scratch off.

17. The method of claim 14, further comprising the steps of removing selected information from an engineering blank layout of the two dimensional sheet to form a keyline, and adding the filled regions of relative distortion to the keyline.

18. The method of claim 17, further comprising the step of constraining a graphical design to the keyline with the added filled regions of relative distortion.

19. The method of claim 17, wherein the step of adding the filled regions of relative distortion includes the steps of providing a two dimensional layer containing the filled regions of relative distortion, and overlaying the two dimensional layer on the keyline.

20. The method of claim 14, wherein said step of assigning a graphical designator to each different region of relative distortion includes the step of assigning a graphical designator in accordance with a standard guide.

21. A method of designing a graphical layout for a three dimensional item formed from a two dimensional sheet, comprising the steps of:

observing a keyline drawing of the two dimensional sheet;

observing a color overlay for the keyline drawing indicating a plurality of regions of relative distortion resulting from forming the three dimensional item from the two dimensional sheet; and conforming the graphical layout design to the keyline drawing and the color overlay.

* * * * *